Patented June 1, 1937

2,082,344

UNITED STATES PATENT OFFICE 2,082,344

HIGH MOLECULAR DYESTUFFS OF THE DIOXAZINE SERIES

Georg Kränzlein, Heinrich Greune, Werner Schultheis, Frankfort-on-the-Main, and Gerhard Langbein, Hofheim-on-the-Taunus, Germany, assignors to General Aniline Works, Inc., New York, N. Y., a corporation of Delaware No Drawing. Application April 20, 1934, Serial No. 721,638. In Germany April 26, 1933

5 Claims. (Cl. 260—28)

The present invention relates to high molecular dyestuffs of the dioxazine series.

We have found that dyestuffs of valuable properties are obtainable by condensing a 1.4-benzoquinone compound with an amine of a three-nuclear ring compound which does not contain a cyclicly bound nitrogen atom in presence or absence of an organic or inorganic oxidizing agent, a metal chloride or an acylating agent at a temperature exceeding 120° C. and sulfonating, if desired, the products thus obtained. The same products may be obtained by heating to a temperature exceeding 120° C. in a solvent of high boiling point, if desired with addition of an organic or inorganic oxidizing agent, an acylating agent or a metal chloride, the primary condensation products obtainable by heating below about 120° C. in a solvent a 1.4-benzoquinone with an amine of a three-nuclear ring compound which does not contain a cyclicly bound nitrogen atom and, if required, sulfonating the products thus obtained. As 1.4-benzoquinone compounds there may be used the 1.4-benzoquinone itself, its halogen derivatives such as, for instance, chloranil, its alkyl derivatives such as, for instance, toluquinone or similar compounds. As amino derivatives of the above mentioned three-nuclear ring compounds there may be used, for instance, amines of fluorene, diphenyleneoxide, diphenylene-sulfide, diphenylenedioxide, phenanthrene, anthracene, fluorenone, xanthone, thioxanthone or the like.

The dioxazines thus obtainable which may be characterized by the probable general formula:

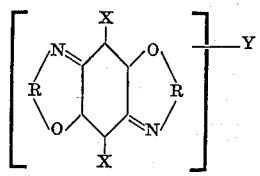

wherein X means hydrogen, halogen, alkyl or aryl, Y means that the compound may be sulfonated and the two R's mean identical three-nuclear radicals containing no cyclicly bound nitrogen atom, the R's being bound to the N and O atoms of the molecule so that a six-membered ring is formed, may be used as pigment dyes for color lakes, or for coloring wall-paper, paper, caoutchouc and artificial products or as water-soluble sulfonic acids for dyeing animal, vegetable and artificial fibers or mixed fabrics. By converting the dyestuff sulfonic acids into the corresponding barium or calcium salts or a like suitable salt, valuable pigments are obtained.

The following examples serve to illustrate the invention but they are not intended to limit it thereto, the parts being by weight:

(1) 18.1 parts of 2-aminofluorene, 14 parts of chloranil and 10 parts of sodium acetate are stirred for 1 hour at room temperature in 500 parts of alcohol and the whole is then heated to boiling for 2 hours. After cooling the product is filtered with suction and washed with alcohol and then with water. The brown condensation product dissolves in sulfuric acid monohydrate to a blue solution. With alkali and hydrosulfite a feebly yellow vat is obtained.

By using instead of chloranil the corresponding quantity of 2.3.5.6-tetrabromo-1.4-benzoquinone, a similar compound is obtained.

(2) 10 parts of the intermediate product obtainable according to Example 1, paragraph 1, are suspended in 150 parts of nitrobenzene, 10 parts of benzoylchloride are added and 7–8 parts of pyrolusite are introduced, while stirring. The whole is heated to 150° C. and stirred at this temperature for 2 hours. In order to complete the reaction, the whole is boiled for a further hour. The solid product is then filtered by suction at 130° C. and washed with nitrobenzene and alcohol. In order to eliminate the excess of pyrolusite, the product is acidified with sulfuric acid and stirred with a bisulfite solution, filtered with suction, washed until neutral and dried. The product is obtained in the form of needles having a green surface luster, dissolved in sulfuric acid monohydrate to a blue-green solution and, when finely divided, represents a violet pigment. The new compound has the probable constitution:

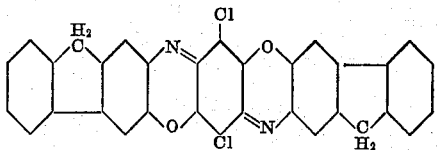

10 parts of the pigment are stirred for 1 hour at 20° C.–25° C. in 200 parts of fuming sulfuric acid of 20% strength. The whole is then poured on ice, filtered with suction and the product is washed with sodium chloride solution until neutral. The sulfonic acid dissolves in water to a violet solution and dyes the animal, vegetable and artificial fiber clear violet tints. The dyeings have excellent fastness properties. In the form of its barium or calcium salt the sulfonic acid constitutes a valuable violet pigment dye.

By using in this example as parent material the intermediate product obtainable according to Example 1, paragraph 2, a pigment and an acid, respectively, are obtained which have properties similar to those of the dyestuffs described in that example.

(3) 10 parts of the intermediate product obtainable according to Example 1 are suspended in 120 parts of glacial acetic acid and at 100° C. 30 parts of sodium bichromate are added gradually. The whole is then heated to boiling for 1 hour, the reaction mixture is poured into 1200 parts of sulfuric acid of about 30% strength, filtered with suction and the solid product is washed until neutral and dried. The reaction product is identical with that obtainable according to Example 2 and may be sulfonated as indicated in that example.

(4) 37 parts of 2-aminodiphenyleneoxide are heated to boiling in 700 parts of alcohol with 30 parts of chloranil and 20 parts of sodium acetate for 5 hours. The brown condensation product precipitates. It is filtered with suction, while hot, and washed with alcohol and water.

(5) 20 parts of the condensation product obtainable according to Example 4 are heated to boiling for 4 hours in 500 parts of nitrobenzene and 6 parts of m-nitrobenzene-sulfochloride. The condensation product precipitates in the form of needles having a bronze luster. At 120° C. the whole is filtered with suction and the solid product is washed with hot nitrobenzene. The reaction product, when finely divided, represents a red violet pigment. In strong sulfuric acid it dissolves to a blue solution. The new compound has the probable constitution:

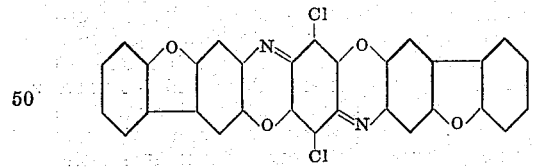

10 parts of the pigment are stirred for 1 hour at 20° C.–25° C. in 200 parts of fuming sulfuric acid of 5% strength. The whole is poured on ice, the sulfonic acid which has precipitated is filtered with suction and washed with sodium chloride solution until neutral. The sulfonic acid dissolves in water to a red-violet solution and dyes the vegetable, animal and artificial fibers as well as mixed fabrics clear red violet tints. The dyeings have excellent fastness properties.

(6) 19.3 parts of beta-anthramine, 14 parts of chloranil and 10 parts of sodium acetate are heated to boiling for 2 hours in 300 parts of alcohol. The reaction product which has precipitated is filtered with suction and washed with alcohol and water. The dark brown condensation product dissolves in sulfuric acid monohydrate to a red solution.

(7) 10 parts of the condensation product obtainable according to Example 6 are heated to boiling for half an hour in 100 parts of nitrobenzene with addition of 3 parts of 2.4-dinitrophenol. The reaction product which has precipitated is filtered with suction at 50° C. and washed with nitrobenzene and alcohol. The reaction product crystallizes in the form of needles having a red surface luster and dissolves in sulfuric acid monohydrate to an olive-green solution. The pigment has a blue-green color and corresponds to the probable constitution:

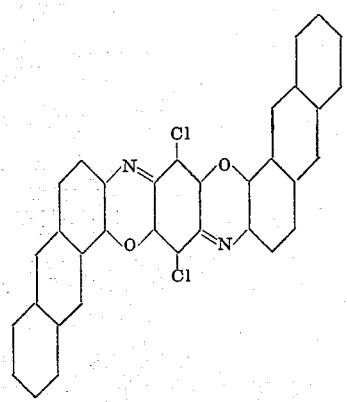

10 parts of the pigment are stirred for 1 hour at about 20° C. in 200 parts of sulfuric acid monohydrate. The whole is poured on ice, the product is filtered with suction and the solid matter is washed with sodium chloride solution until neutral. The sulfonic acid dissolves in water to a bluegreen solution and dyes the animal, vegetable and artificial fiber clear bluegreen tints of excellent fastness properties.

(8) 19.3 parts of 3-aminophenanthrene and 14 parts of chloranil are slowly heated to boiling in 300 parts of nitrobenzene. The whole is boiled for 1 hour and the reaction product which has precipitated is filtered with suction at 120° C. and washed with nitrobenzene and alcohol. The product crystallizes in the form of needles having a green luster; as pigment it has a blue violet color. It dissolves in sulfuric acid monohydrate to a violet solution. The new compound has the probable constitution:

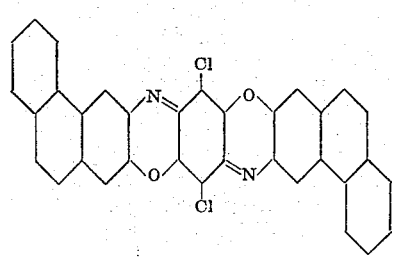

10 parts of the pigment are stirred for 1 hour at about 20° C. in 200 parts of fuming sulfuric acid of 10% strength. The whole is poured on ice, the sulfonic acid which has precipitated is filtered with suction and washed with sodium chloride solution until neutral. The sulfonic acid dissolves in water to a violet solution and dyes the vegetable, animal and artificial fiber bluish violet tints of excellent fastness properties.

(9) 19.5 parts of 2-aminofluorenone and 18 parts of benzoquinone are heated to boiling for 2 hours in 300 parts of alcohol. The whole is filtered with suction and the product is washed with alcohol and water. The dark brown condensation product dissolves in concentrated sulfuric acid to a blue solution.

(10) 10 parts of the intermediate product obtainable according to Example 9 are heated to boiling for 2 hours in 150 parts of chloronaphthalene with addition of 3 parts of metanitrobenzenesulfochloride. At 150° C. the whole is filtered with suction and the solid matter is washed with chloronaphthalene and alcohol. In a finely divided state the reaction product forms a red violet pigment. The new compound has the probable constitution:

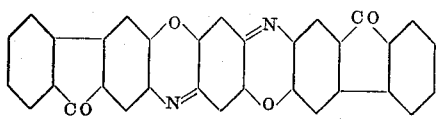

It may be sulfonated by means of fuming sulfuric acid of 20% strength. The sulfonic acid obtained yields on the animal, vegetable and artificial fiber red violet tints of good fastness properties.

(11) 43 parts of aminodiphenylenedioxide melting at 133° C. (cf. Dissertation by W. Strubach, Dresden 1912) are heated to boiling for 5 hours in 700 parts of alcohol with 30 parts of chloranil and 20 parts of sodium acetate. The solid product which has precipitated is filtered with suction, while hot, and washed with alcohol and water. The brown condensation product yields with an alkaline hydrosulfite solution a yellow vat.

(12) 50 parts of the condensation product obtainable according to Example 11 are heated to boiling for some time in 750 parts of nitrobenzene and 10 parts of ferric chloride. The brown color of the solution soon turns violet and the reaction product separates in the form of crystals having a bronze luster. At 140° C. the whole is filtered with suction and the solid matter is washed with hot nitrobenzene. In a finely divided state the new product forms a violet pigment. It has the probable constitution:

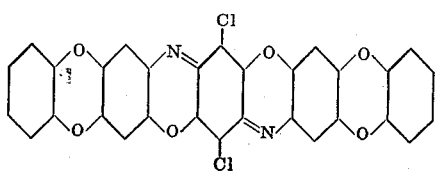

In strong sulfuric acid it dissolves to a violet solution. When strong sulfuric acid or chlorosulfonic acid is allowed to act for a prolonged time on the product, sulfonation takes place.

10 parts of the above pigment are dissolved in 200 parts of sulfuric acid monohydrate and the whole is stirred for some hours at 20° C.–25° C. Thereupon, it is poured on ice and the sulfonic acid obtained is filtered with suction and washed with sodium chloride solution until neutral. In water the sulfonic acid dissolves to a blue violet solution and dyes the vegetable, animal and artificial fiber as well as mixed fabrics blue violet tints of excellent fastness properties.

(13) 43 parts of aminodiphenylenedioxide, melting at 133° C., are heated to boiling for 5 hours with 1000 parts of alcohol and 37 parts of toluquinone. The condensation product precipitates and is filtered with suction, while hot. It forms a brown product which yields with alkaline hydrosulfite a yellow vat.

By using in this example instead of toluquinone the corresponding quantity of 3.6-di-paratolyl-1.4-benzoquinone, a similar compound is obtained.

(14) 20 parts of the condensation product obtainable according to Example 13, paragraph 1, are heated to boiling for 6 hours in 400 parts of nitrobenzene. The reaction product precipitates in the form of needles having a bronze luster; they are filtered with suction and washed. In a finely divided state, the product forms a violet pigment. In strong sulfuric acid it dissolves to a violet solution.

10 parts of the pigment are stirred for 3 hours in 200 parts of sulfuric acid monohydrate. The whole is poured on ice and the sulfonic acid which has precipitated is filtered with suction. It dissolves in water to a violet solution and dyes the animal, vegetable and artificial fiber as well as mixed fabrics violet tints of excellent fastness properties.

By using the condensation product obtainable according to Example 13, paragraph 2, there is obtained a pigment and an acid, respectively, which have properties similar to those of the dyestuffs heretofore described.

We claim:
1. The compounds of the group consisting of compounds of the following general formula:

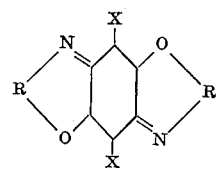

wherein X means a member of the group consisting of hydrogen, halogen, alkyl and aryl of the benzene series and the two R's mean identical three-nuclear radicals of the group of consisting of fluorene, diphenyleneoxide, diphenylenesulfide, and fluorenone, the R's being bound to the N-atoms and O-atoms of the molecule to form a six membered ring, and the sulfonic acids of these compounds.

2. The compounds of the group consisting of the compound of the formula:

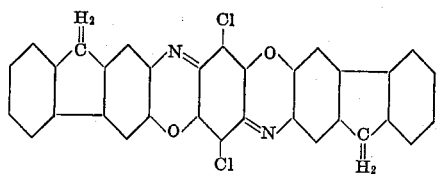

and sulfonic acids thereof.

3. The compound of the formula

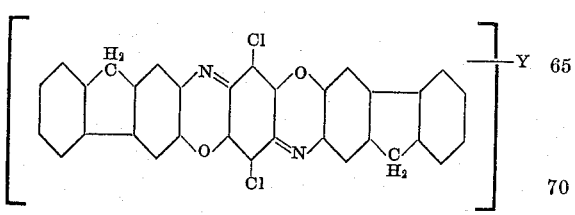

wherein Y means that the compound is sulfonated, dissolving in water to a violet solution and dying the animal, vegetable and artificial fiber clear violet tints of excellent fastness properties.

4. The compound of the formula

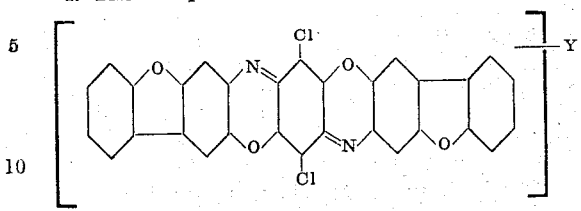

wherein Y means that the compound is sulfonated, dissolving in water to a red-violet solution and dying the vegetable, animal and artificial fibers as well as mixed fabrics clear red violet tints of excellent fastness properties.

5. The compounds of the group consisting of the compound of the formula:

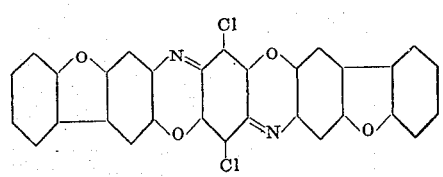

and sulfonic acids thereof.

GEORG KRÄNZLEIN.
HEINRICH GREUNE.
WERNER SCHULTHEIS.
GERHARD LANGBEIN.